Jan. 8, 1929.
J. E. MITCHELL
1,698,059
FISH TRAY CLEANING APPARATUS
Filed May 17, 1927
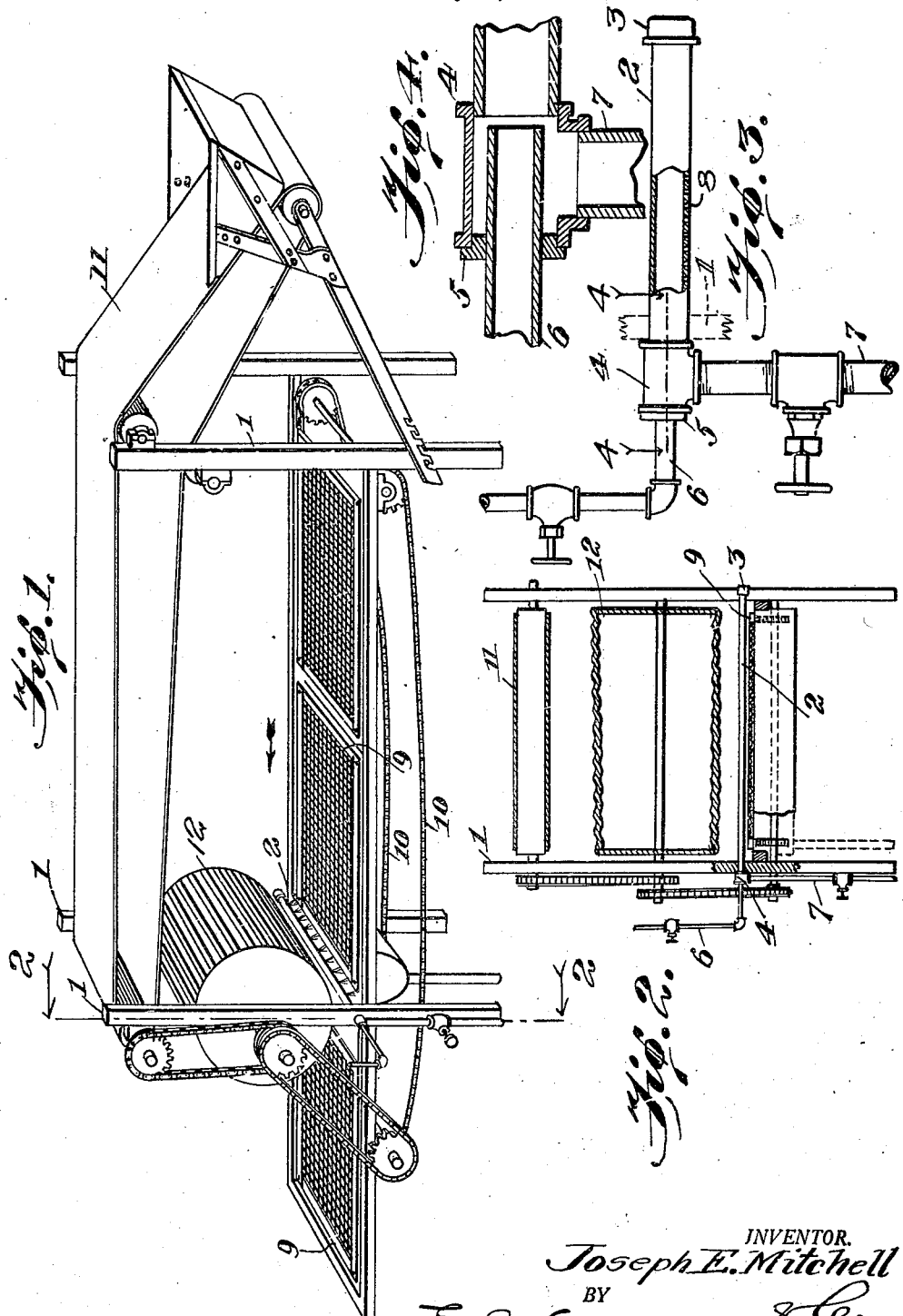
INVENTOR.
Joseph E. Mitchell
BY
E. E. Vrooman & Co.,
ATTORNEYS.

Patented Jan. 8, 1929.

1,698,059

UNITED STATES PATENT OFFICE.

JOSEPH E. MITCHELL, OF EASTPORT, MAINE.

FISH-TRAY-CLEANING APPARATUS.

Application filed May 17, 1927. Serial No. 192,071.

This invention relates to a fish-tray cleaning apparatus.

One of the objects of the invention is to provide a compact and efficient apparatus for cleaning trays that have recently been covered with sardines or other fish, in sardine packing plants, and which trays are to be cleaned before again being used and covered with sardine or other fish. In my apparatus, I have provided efficient means for cleaning trays from all waste matter, dirt, grease and other foreign substances that have become attached to said trays by their previous use.

Another object of the invention is the construction of an apparatus that involves a peculiar combination of parts whereby trays are thoroughly cleaned on both sides by the peculiar application of boiling water to the same, thus prolonging the usefulness of each tray so treated, and also, at the same time, improving the flavor of all fish or sardines cooked on said trays after being so subjected to this process which removes all foreign flavors that might otherwise affect the natural taste or flavor of the fish or sardine.

My process depends somewhat upon the speed of the belt conveyor that carries the trays under the falling stream of boiling water as to the effectiveness of the cleaning process, as a slowly moving conveyor allows greater time for the falling water to play upon the whole length of the tray, yet approximately twenty-five trays per minute can be thoroughly cleaned by boiling water, through the use of my process and apparatus.

A further object of my invention is the construction of a simple and compact apparatus, which is far more efficient than the present method of cleaning trays by brushes or by acid, and enables the trays to be cleaned at a very low expense, and in much quicker time than by the present methods of using brushes or applying acid to the plates or trays.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a perspective view of an apparatus constructed in accordance with the present invention.

Figure 2 is a sectional view taken on line 2—2, Figure 1, and looking in the direction of the arrows.

Figure 3 is a view partly in elevation and partly in section of the spraying device, of my apparatus.

Figure 4 is an enlarged sectional view taken on line 4—4, Figure 3, and looking in the direction of the arrows.

Referring to the drawings by numerals, 1 designates the uprights of the apparatus, through one of which extends the horizontal pipe 2, which I will call the "water" pipe. On the outer end of pipe 2 is a removable cap 3, while the opposite or inner end of pipe 2 is fitted in a siphon T 4. The outer end of the siphon T 4 is partly closed by a cap 5, through which cap 5 extends steam pipe 6. Water is conducted by pipe 7 in the factory to said siphon T 4. In this siphon T 4, the steam and the water mingle. Through pipe 6 passes live steam under pressure, and its force causes the steam to rush through the siphon T 4, sucking the water in said siphon T along with it, and the steam, because of its pressure, continues in a straight line, that is a prolongation of its former course, into and through the horizontal pipe 2. This pipe 2 along its base is provided with aligned apertures 8 of one-eighth of an inch in diameter. Due to the closed end of pipe 2 and the force of the stream, the now hot water is forced through apertures 8 and by gravity drops upon the trays 9, that are placed beneath this falling water. The trays 9 are placed upon a belt conveyor 10 that travels in a horizontal direction and parallel with the aforesaid pipe 2, but at a distance of three quarters of an inch from said horizontal pipe 2, thus as the trays 9 pass under the spraying device, the falling stream of boiling water is directed upon a tray resulting in thoroughly cleaning and scalding it, whereby its usefulness is greatly increased, owing to it being thoroughly cleaned and scalded.

My process depends somewhat upon the speed of the conveyor 10 that carries the trays under the falling stream of boiling water as to the effectiveness of the cleaning process, as a slowly moving conveyor allows greater time for the falling water to play upon the whole length of the tray, yet a large number of the trays are treated each minute by my apparatus.

It is to be understood that the fish are placed in the hopper A and then are carried to the rear end of the apparatus by means of belt conveyor 11 and fall upon the longitudinally-grooved fish-receiving drum 12 and thence are spread on the tray 9 at the rear end of the apparatus, and which tray is adapted to be moved along the machine, by conveyor 10, when the tray is to be cleaned and loaded. The trays 9 are placed on the conveyor 10 by hand; a person standing by the side of the apparatus places the tray with his hand upon the conveyor 10, thus starting the whole process of cleaning and loading the tray. The fish are conveyed by the carrier or conveyor 11 to the grooved revolving drum 12. The grooves in said revolving drum are so spaced as to exactly cover, with the fish or herring, the length of the single tray 9. There is about two feet of space between the conveyor 11 and the conveyor 10, which space is plenty of room to permit the operator standing by the machine to place the empty trays upon he conveyor 10; said placed trays being carried under the spraying device and thoroughly cleaned. Then as a cleaned tray passes from under the spraying device, said tray is loaded uniformly with fish from the distributing drum 12, after which the loaded tray is lifted from the conveyor 10 and placed upon a suitable rack.

It is to be understood that the spraying device is below the distributing drum 12 with a two inch clearance between said drum and conveyor upon which conveyor is carried the trays. The revolving drum 12 rotates with a motion opposite in direction to the motion of the moving tray approaching said revolving drum, on conveyor 10.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an apparatus of the class described, the combination of a frame provided with uprights, a conveyor mounted upon said frame, a spraying device having a siphon T bearing at one end against one of said uprights, an apertured horizontal pipe with a cap on its outer end and extending through an upright and at its inner end into said siphon T, a steam pipe extending into said siphon T and discharging into said apertured horizontal pipe, and said conveyor adapted to convey trays under and past said apertured horizontal pipe.

2. In an apparatus of the class described, the combination of a frame provided with an upright, a siphon T contiguous to said upright, an apertured pipe, constituting a sprayer, extending through said upright and into said siphon T, a steam pipe extending into said siphon T, and means for passing a tray under said apertured pipe.

3. In an apparatus of the class described, the combination with a frame, of tray conveying means on said frame, spraying means on said frame and discharging towards said tray conveying means, fish distributing means above said tray conveying means and adapted to place fish on a clean tray after passing said spraying means, and means for supplying fish to said fish distributing means.

4. In an apparatus of the class described, the combination with a frame, of a tray carrying conveyor on said frame, a spraying device on said frame above said tray carrying conveyor, a fish distributing drum on said frame above said tray carrying conveyor and contiguous to said spraying device, and a fish carrying conveyor on said frame and discharging onto said fish distributng drum.

5. In an apparatus of the class described, the combination with a frame, of a horizontal tray conveyor on said frame, a spraying device on said frame above said tray conveyor, a grooved fish-distributing rotatable drum on said frame above said tray conveyor and contiguous to said spraying device, and a fish-carrying conveyor on said frame and having its discharge end above said drum and discharging thereon.

In testimony whereof I hereunto affix my signature.

JOSEPH E. MITCHELL.